United States Patent
Sim et al.

(10) Patent No.: US 12,456,033 B2
(45) Date of Patent: Oct. 28, 2025

(54) MULTI-STREAM RECURRENT NEURAL NETWORK TRANSDUCER(S)

(71) Applicant: GOOGLE LLC, Mountain View, CA (US)

(72) Inventors: Khe Chai Sim, Dublin, CA (US); Françoise Beaufays, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 867 days.

(21) Appl. No.: 17/619,643

(22) PCT Filed: Dec. 15, 2020

(86) PCT No.: PCT/US2020/065065
§ 371 (c)(1),
(2) Date: Dec. 16, 2021

(87) PCT Pub. No.: WO2021/162779
PCT Pub. Date: Aug. 19, 2021

(65) Prior Publication Data
US 2022/0405549 A1    Dec. 22, 2022

Related U.S. Application Data

(60) Provisional application No. 62/976,315, filed on Feb. 13, 2020.

(51) Int. Cl.
*G06N 3/044* (2023.01)
*G06N 3/08* (2023.01)

(52) U.S. Cl.
CPC .............. *G06N 3/044* (2023.01); *G06N 3/08* (2013.01)

(58) Field of Classification Search
CPC .......... G06N 3/044; G06N 3/08; G06N 3/045; G10L 15/16; G10L 15/22; G10L 25/30
See application file for complete search history.

(56) References Cited

U.S. PATENT DOCUMENTS 9,263,036 B1 *  2/2016  Graves ................... G10L 15/16
9,665,823 B2    5/2017  Saon et al.
(Continued)

FOREIGN PATENT DOCUMENTS

| CN | 108197701 | | 6/2018 |
|----|-----------|---|--------|
| CN | 110263916 | A | 9/2019 |
| WO | 2018102240 | A1 | 6/2018 |

OTHER PUBLICATIONS

Li, Ruizhi, et al. "Multi-stream end-to-end speech recognition." IEEE/ACM Transactions on Audio, Speech, and Language Processing 28 (2019): 646-655. (Year: 2019).*

(Continued)

*Primary Examiner* — Brian L Albertalli
(74) *Attorney, Agent, or Firm* — Gray Ice Higdon

(57) ABSTRACT

Techniques are disclosed that enable generating jointly probable output by processing input using a multi-stream recurrent neural network transducer (MS RNN-T) model. Various implementations include generating a first output sequence and a second output sequence by processing a single input sequence using the MS RNN-T, where the first output sequence is jointly probable with the second output sequence. Additional or alternative techniques are disclosed that enable generating output by processing multiple input sequences using the MS RNN-T. Various implementations include processing a first input sequence and a second input sequence using the MS RNN-T to generate output. In some implementations, the MS RNN-T can be used to process two or more input sequences to generate two or more jointly probable output sequences.

21 Claims, 7 Drawing Sheets

(56) References Cited

U.S. PATENT DOCUMENTS

| | | | |
|---|---|---|---|
| 11,862,146 B2* | 1/2024 | Han | G10L 15/16 |
| 2017/0140753 A1 | 5/2017 | Jaitly et al. | |
| 2018/0157638 A1 | 6/2018 | Li | |
| 2020/0043467 A1 | 2/2020 | Qian et al. | |
| 2020/0126538 A1* | 4/2020 | Han | G10L 15/063 |
| 2020/0251099 A1* | 8/2020 | Jaitly | G10L 15/16 |
| 2021/0050016 A1* | 2/2021 | Kim | G10L 15/16 |
| 2021/0183373 A1* | 6/2021 | Moritz | G06N 3/045 |
| 2021/0312905 A1* | 10/2021 | Zhao | G10L 15/16 |
| 2024/0428072 A1* | 12/2024 | Zhuang | G06N 3/045 |

OTHER PUBLICATIONS

Zhou, Pan, et al. "Modality attention for end-to-end audio-visual speech recognition." ICASSP 2019-2019 IEEE International Conference on Acoustics, Speech and Signal Processing (ICASSP). IEEE, 2019. (Year: 2019).*

Chang, Xuankai, et al. "MIMO-Speech: End-to-end multi-channel multi-speaker speech recognition." 2019 IEEE Automatic Speech Recognition and Understanding Workshop (ASRU). IEEE, 2019. (Year: 2019).*

He, Yanzhang, et al. "Streaming end-to-end speech recognition for mobile devices." ICASSP 2019-2019 IEEE International Conference on Acoustics, Speech and Signal Processing (ICASSP). IEEE, 2019. (Year: 2019).*

Sklyar, Ilya, Anna Piunova, and Yulan Liu. "Streaming multi-speaker ASR with RNN-T." ICASSP 2021-2021 IEEE International Conference on Acoustics, Speech and Signal Processing (ICASSP). IEEE, 2021. (Year: 2021).*

Wang, Xiaofei, et al. "Stream attention-based multi-array end-to-end speech recognition." ICASSP 2019-2019 IEEE International Conference on Acoustics, Speech and Signal Processing (ICASSP). IEEE, 2019. (Year: 2019).*

Makino, Takaki, et al. "Recurrent neural network transducer for audio-visual speech recognition." 2019 IEEE automatic speech recognition and understanding workshop (ASRU). IEEE, 2019. (Year: 2019).*

Shafey, Laurent El, Hagen Soltau, and Izhak Shafran. "Joint speech recognition and speaker diarization via sequence transduction." arXiv preprint arXiv:1907.05337 (2019). (Year: 2019).*

Bagby, Tom, Kanishka Rao, and Khe Chai Sim. "Efficient implementation of recurrent neural network transducer in tensorflow." 2018 IEEE Spoken Language Technology Workshop (SLT). IEEE, 2018. (Year: 2018).*

European Patent Office; Communication pursuant to Article 94(3) EPC issued in Application No. 20841808.7; 5 pages; dated Aug. 11, 2023.

Tripathi, A. et al., "End-to-End Multi-Talker Overlapping speech Recognition;" IEEE International Conference on Acoustics, Speech and Signal Processing (ICASSP); pp. 6129-6133; May 4, 2020 May 4, 2020.

European Patent Office; International Search Report and Written Opinion of PCT/US2020/065065; 11 pages; dated Apr. 7, 2021 Apr. 7, 2021.

Wang, et al. "An Overview of End-To-End Automatic Speech Recognition;" Symmetry 11, No. 8 (2019): 1018; 26 pages; dated Aug. 7, 2019 Aug. 7, 2019.

Graves, Alex, "Sequence Transduction with Recurrent Neural Networks;" arXiv preprint arXiv:1211.3711v1; 9 pages; dated Nov. 14, 2012 Nov. 14, 2012.

Bruguier, A. et al., "Phoebe: Pronunciation-aware Contextualization for End-to-end Speech Recognition;" in Proceedings of 2019 IEEE International Conference on Acoustics, Speech and Signal Processing (ICASSP); pp. 6171-6175; May 2019.

Hu, K. et al. "Phoneme-Based Contextualization for Cross-Lingual Speech Recognition in End-to-End Models;" arXiv preprint arXiv:1906. 09292v3; 5 pages; Jul. 2019.

European Patent Office, Intention to Grant issued in Application No. 20841808.7; 54 pages; dated Sep. 4, 2024.

China National Intellectual Property Administration, First Examination Action issued in Application No. 202080069355.X, 22 pages, dated Sep. 4, 2025.

* cited by examiner

MULTI-STREAM RECURRENT NEURAL NETWORK TRANSDUCER(S)

BACKGROUND

Recurrent neural network transducers (RNN-Ts) have been utilized for various technical tasks, such as automatic speech recognition (ASR). For example, in performing ASR an RNN-T can be used to process a single audio stream that captures a spoken utterance to generate predicted text for the spoken utterance. RNN-Ts process a single input stream and generate a single output stream.

SUMMARY

Implementations disclosed herein are directed towards jointly generating two or more output sequences, by processing one or more input sequences using a multi-stream recurrent neural network transducer (MS RNN-T) model. For example, a MS RNN-T can process audio data capturing an utterance to jointly generate (1) phoneme sequence of the utterance and (2) grapheme sequence of the utterance. Additionally or alternatively, an MS RNN-T can process audio data capturing overlapping speech by a first speaker and a second speaker to generate (1) a text representation of the speech spoken by the first speaker and (2) a text representation of the speech spoken by the second speaker. As a further example, a MS RNN-T model can process audio data capturing an utterance, where the utterance includes one or more portions spoken by a speaker in a first language, and one or more portions spoken by the speaker in a second language, to generate (1) a text representation of the one or more portions spoken by the speaker in the first language and (2) a text representation of the one or more portions spoken by the speaker in the second language.

Additionally or alternatively, implementations disclosed herein are directed towards generating one or more output sequences by processing two or more input sequences using a MS RNN-T model. For example, a MS RNN-T can be used to process (1) a first channel of audio data capturing an utterance and (2) a second channel of audio data capturing the utterance, to generate a text representation of the utterance. Additionally or alternatively, a MS RNN-T can be used to process (1) audio data capturing an utterance spoken by a speaker and (2) gesture data (e.g., image(s)) capturing a gesture made by the speaker to generate a recognition of a user command indicated by the utterance and/or the gesture.

In some implementations, a MS RNN-T can include a separate encoder for each input sequence and a separate encoder for each output. For example, a MS RNN-T with three encoders can be used to process a single input sequence (the first stream) to generate a first output sequence (the second stream) and a second output sequence (the third stream). Additionally or alternatively, a MS RNN-T with three encoders can be used to process a first input sequence (the first stream) and a second input sequence (the second stream), to generate an output sequence (the third stream). Additional and/or alternative numbers of input sequences (and corresponding input stream encoders) and/or output sequences (and corresponding output stream encoders) can be used (e.g., a MS RNN-T with 2 input stream encoders and 2 output stream encoders, 1 input stream encoder and 3 output stream encoders, 3 input stream encoders and 1 output stream encoders, 3 input stream encoders and 3 output stream encoders, etc.). Standard RNN-T models are a special two stream case which include a single input stream sequence (and corresponding single input encoder) and a single output stream sequence (and corresponding single output encoder).

In some implementations, each encoder of the MS RNN-T can be used to process an input sequence to generate an encoded representation of the input sequence (e.g., to generate a state vector for the stream). For example, a three stream MS RNN-T can include a first encoder for the first stream, a second encoder for the second stream, and a third encoder for the third stream. In some implementations, the encoded representation for each stream can be processed using a joint network to generate predicted output. In some implementations, the predicted output can be used to update the output stream sequence for one of the output streams. For example, when the MS RNN-T is used to generate a phoneme sequence and a grapheme sequence of an utterance, the predicted output can be a phoneme. The input sequence for the phoneme stream (an output stream) can be updated based on the generated phoneme. Similarly, the predicted output can be a grapheme, and the input sequence for the grapheme stream (an output stream) can be updated based on the generated grapheme.

In some implementations, the corresponding output stream to associate with predicted output can be determined directly based on in the predicted output. For example, a system can distinguish between a phoneme and a grapheme without further processing due to the differences between phonemes and graphemes. In some implementations, a stream selector can be utilized to associate predicted output with its corresponding stream. For example, a MS RNN-T can be used to generate a text representation of speech of a first speaker and a text representation of speech of a second speaker by processing audio data capturing overlapping speech of the first speaker and the second speaker. The stream selector can, for example, include one or more additional network models used to determine with which output stream to associate predicted output.

Accordingly, various implementations set forth techniques for jointly generating output sequences. In contrast, conventional techniques can require independently generating a first output sequence by processing an input sequence using a first model, and generating a second output sequence by processing the input sequence using a separate second model. Computing resources (e.g., processor cycles, memory, battery power, etc.) can be conserved by using only a single encoded representation of the input sequence in generating both the first output stream and the second output stream. Additionally or alternatively, computing resources (e.g., memory) can be conserved through only storing and/or loading a single MS RNN-T vs. multiple (collectively larger data size) RNN-Ts. Additionally or alternatively, the MS RNN-T can learn to generate both the first output stream and the second output stream using a joint network—and to do so in a manner where the generated output is conditioned on both the previously generated first output sequence and the previously generated second output sequence. By jointly generating output sequences, the MS RNN-T can be trained faster (e.g., in a shorter amount of time, with fewer training examples, etc.) than training a first model to generate the first output sequence and a second model to generate the second output sequence. In other words, the MS RNN-T can learn to generate output faster, compared to conventional techniques, by training the model to learn relationships between jointly probable data which would otherwise be unavailable to the separately trained first model (to generate the first output sequence) and second model (to generate the second output sequence).

The above description is provided only as an overview of some implementations disclosed herein. These and other implementations of the technology are disclosed in additional detail below.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
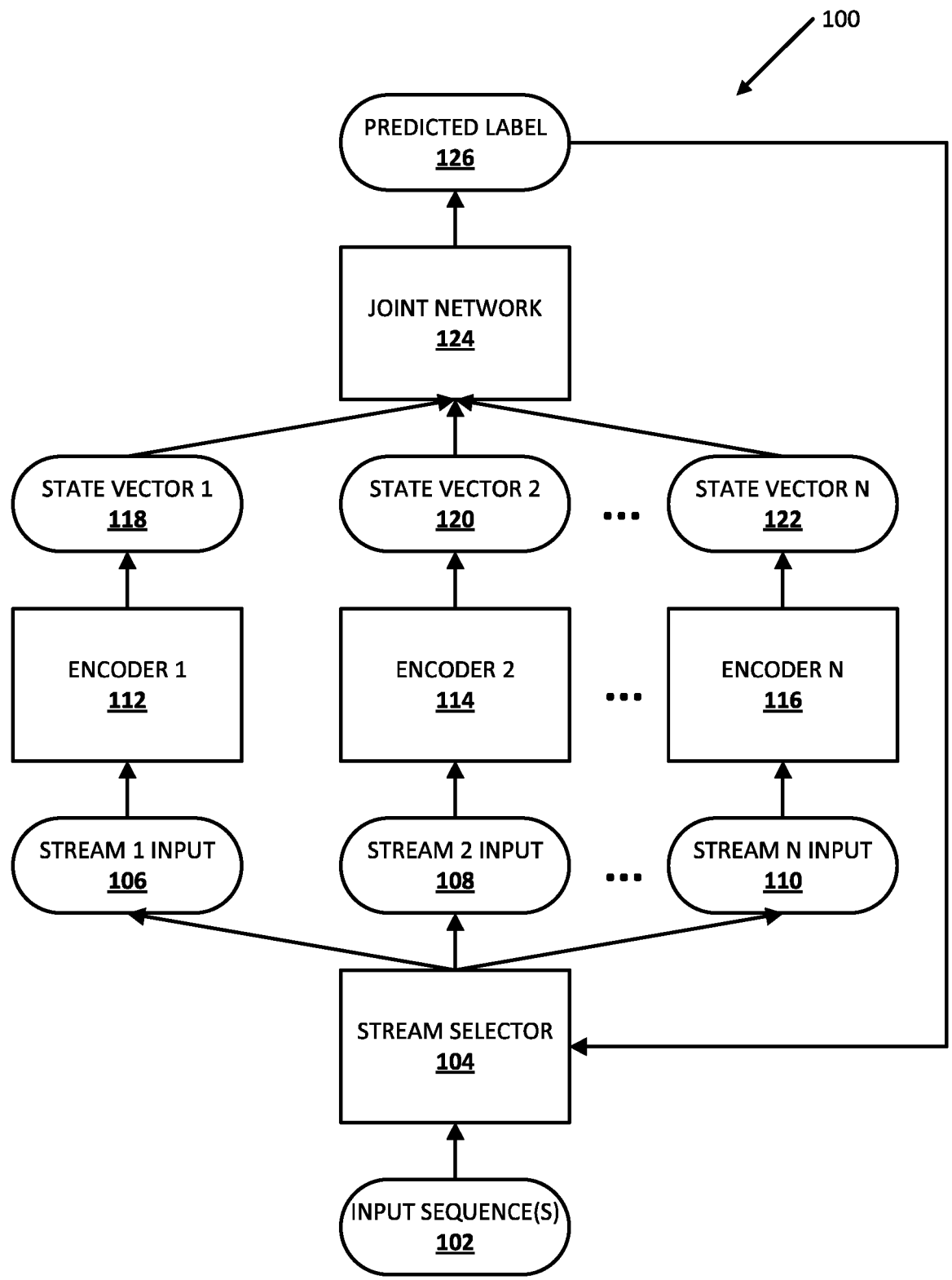
FIG. 1 illustrates an example of a multi-stream recurrent neural network transducer (MS RNN-T) model in accordance with various implementations disclosed herein.

Techniques described herein are directed towards a multi-task modeling technique called multi-stream recurrent neural network transducer (MS RNN-T). This model can formulated as a generalization to the standard RNN-T model and it is designed to explicitly learn the dependencies between multiple sequence classification tasks using a single unified model. It can be shown how the MS RNN-T model can be trained efficiently with error backpropagation using a parallelized implementation of a forward-backward algorithm to compute the loss and gradients. Like the standard RNN-T model, the proposed model does not require explicit label alignment between data streams. In some implementations, the multi-stream RNN-T model can be applied to multi-task sequence classification problems. For example, the multi-stream RNN-T model can be applied to a joint phoneme and grapheme multi-task speech recognition problem, where it can be demonstrated that the proposed model can explicitly learn the phone-grapheme relationship in an end-to-end fashion.

End-to-end speech recognition systems, such as the Recurrent Neural Network Transducer (RNN-T) and listen-attend-spell (LAS), have been successfully applied to large scale automatic speech recognition (ASR) systems. Moreover, RNN-T has been shown to run on mobile devices, and can be used for on-device ASR personalization. In some implementations, the standard RNN-T model can be a speech recognition model that takes in acoustic feature sequence and outputs grapheme label sequence directly. The standard RNN-T model can encapsulate the acoustic model, language model and pronunciation model in a single neural network. These models are traditionally trained separately in conventional automatic speech recognition systems.

An RNN-T model can consist of two encoder networks that transform acoustic and label sequences into encoded features, which are then combined using a joint network to produce the output label probabilities. It can be shown that the standard RNN-T formulation can be viewed as composing two state-space models, one for the acoustic input space and another for the output label space.

Techniques disclosed herein generalize the formulation of RNN-T to the multi-stream RNN-T model which can handle the composition of multiple state space models. The standard RNN-T model is a special case with 2 streams. This kind of model is able to learn from multiple sequences jointly and is especially useful for multi-task sequence classification. Existing work on multi-task learning that involves multiple sequence labeling tasks typically assumes that the alignment between multiple sequences are already available. In some implementations, the MS RNN-T can be trained without knowing the alignment between sequences from multiple streams.

In some implementations, a multi-stream RNN-T model can be used to handle multiple sequence classification tasks in a unified manner such that the dependencies between the tasks are explicitly modeled. As an illustrative example, let S be the number of streams and N be the number of output labels for the sth stream. A multi-stream RNN-T model can be constrained to output only one label from one of the streams at a time. This can be useful so that the system does not have to model all the output combinations from multiple streams. Therefore, in some implementations, there can be N output labels, where $N=\Sigma_{s=1}^{S}N_s$.

In some implementations, according to a multi-stream RNN-T model, the output probability can be conditionally dependent on the current states of all the streams:

$$P(y|h^{(1)},h^{(2)},\ldots,h^{(S)}) \quad (1)$$

where $h^{(s)}$ is the current state vector for the sth stream and $y \in Y$ is the output label, where Y is the set of all output labels:

$$Y=\{y_1^{(1)},\ldots,y_{N_1}^{(1)},y_1^{(2)},\ldots,y_{N_2}^{(2)},y_1^{(S)},\ldots,y_{N_S}^{(S)}\}$$

And $y_i^{(s)}$ is the ith label for stream s. In some implementations, equation (1) can be modeled by using a neural network whose input is the concatenation of the state vectors from all the streams and the output layer has a softmax activation with N output units.

The state space model for each stream can be modeled by an encoder network (typically a recurrent neural network, such as a Long Short Term Memory (LSTM) network, a Gated Recurrent Network (GRU), etc.). The state transition can be given by:

$$h_t^{(s)}, r_t^{(s)} = f_{RNN}(x_t^{(s)}, r_{t-1}^{(s)}) \quad (2)$$

where $x_t^{(s)}$ and $h_t^{(s)}$ are the input and output of the encoder network for the sth stream and $r_t^{(s)}$ is the internal RNN state. The encoder network can learn to output $h_t^{(s)}$ to summarize the input sequence up to t, $\{x_t^{(s)}, x_{t-1}^{(s)}, \ldots, x_1^{(s)}\}$. FIG. 1 depicts the structure of a multi-stream RNN-T model in accordance with some implementations. Inputs, $x^{(s)}$, can be fed into the respective RNN encoders to obtain the state vectors, $h^{(s)}$. These state vectors can then be stacked and fed into a joint network to obtain the output label probabilities. The output label with the largest probability can be selected as the predicted label. This label can be fed into the encoder for the stream that it belongs to (as indicated by the selector block) to obtain the next state vector. Note that the standard RNN-T corresponds to the case when there are two streams, one for the input acoustic feature sequence and the other for the output label sequence. In some implementations, there is no interest in classifying the acoustic feature, thus the acoustic input stream can have only one output label, which can correspond to a blank label in the original RNN-T formulation.

In some implementations, a multi-stream RNN-T model can be trained by maximizing the following likelihood function:

$$\mathcal{L}^{RNNT} = \log \Sigma_{(q_s) \in Q} \Sigma_{t=1}^{T} P(y_t | h_{q_1(t)}^{(1)}, \ldots, h_{q_S(t)}^{(S)}) \quad (3)$$

where Q can be a set of all possible alignments among all the streams. $q_s$ can be the alignment that corresponds to stream s. $q_s(t)$ can be the state index for stream s that is aligned to the tth label. The alignment length can be given by $T = \Sigma_{s=1}^{S} T_s$, where $T_s$ can be the sequence length of stream s. Note that since the model outputs one label from one stream at a time, the length of the output sequence is T.

For the standard RNN-T model, forward-backward algorithm can be used to efficiently compute the sum over all possible alignments. In some implementations, the same approach can be applied to a multi-stream RNN-T model. Without loss of generality, an example case of S=3 can be considered to derive the equations for forward-backward computation. There can be $T_1 \times T_2 \times T_3$ possible states. Each state can be denoted as $(t_1, t_2, t_3)$, where $0 \le t_1 \le T_1$, $0 \le t_2 \le T_2$ and $0 \le t_3 \le T_3$. In some implementations, $(0,0,0)$ and $(T_1, T_2, T_3)$ are the start and end states respectively.

Figure 3A:
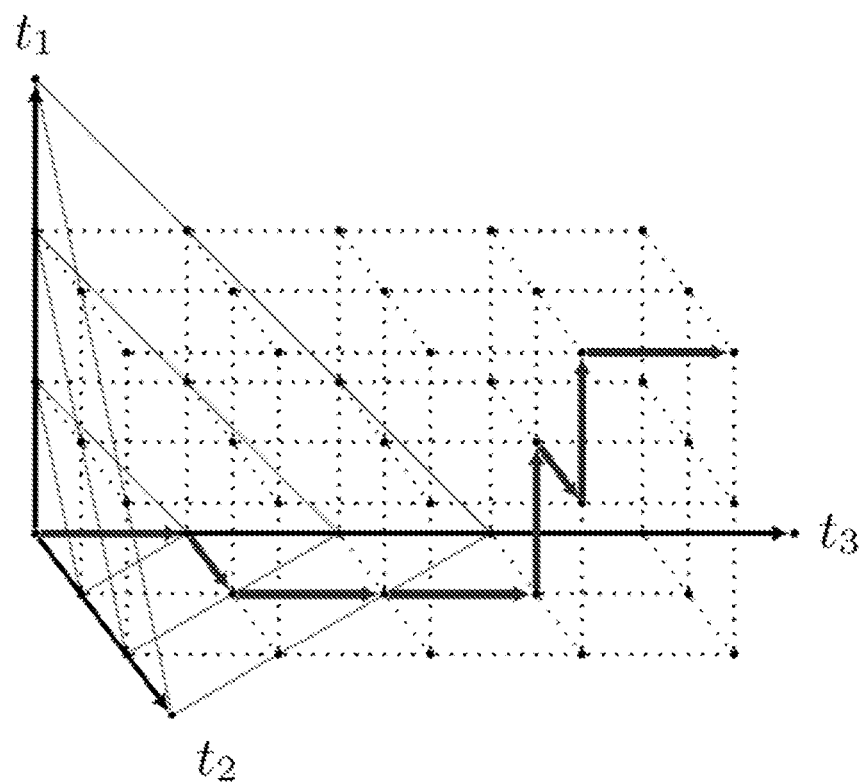
FIG. 3A illustrates a three dimensional grid representation of states which can be used in training a MS RNN-T in accordance with various implementations disclosed herein.

The states can be arranged in a 3-dimensional grid as shown in FIG. 3A. Note that the sum of the state indices $(t_1 + t_2 + t_3)$ can indicate the number of steps needed to reach the state from the start state. The loss function in equation (3) can be expressed in terms of the forward and backward probabilities as follows:

$$\mathcal{L}^{RNNT} = \log \Sigma_{t_1=1}^{T_1} \Sigma_{t_2=1}^{T_2} \alpha_{t_1,t_2,t-t_1-t_2} \beta_{t_1,t_2,t-t_1-t_2} \quad (4)$$

for $1 \le t \le T$. In some implementations, $\alpha_{t_1, t_2, t_3}$ and $\beta_{t_1, t_2, t_3}$ can be the forward and backward probabilities for state $(t_1, t_2, t_3)$. In some implementations, they can be computed recursively:

$$\alpha_{t_1,t_2,t_3} = \alpha_{t_1-1,t_2,t_3} y_{t_1-1,t_2,t_3,k_{t1}}^{(1)} + \alpha_{t_1,t_2-1,t_3} y_{t_1,t_2-1,t_3,k_{t2}}^{(2)} + \alpha_{t_1,t_2,t_3-1} y_{t_1,t_2,t_3-1,k_{t3}}^{(3)} \quad (5)$$

$$\beta_{t_1,t_2,t_3} = \beta_{t_1+1,t_2,t_3} y_{t_1+1,t_2,t_3,k_{t1}}^{(1)} + \beta_{t_1,t_2+1,t_3} y_{t_1,t_2+1,t_3,k_{t2}}^{(2)} + \beta_{t_1,t_2,t_3+1} y_{t_1,t_2,t_3+1,k_{t3}}^{(3)} \quad (6)$$

where $y_{t_1, t_2, t_3, k_t}^{(s)}$ can denote the output probability for the tth label of stream s, $k_t^{(s)}$, given the state $(t_1, t_2, t_3)$. Note how the forward (backward) probabilities can depend on those from the previous (next) steps. This can be illustrated in FIG. 3A. The states that lie on the small, medium and large triangles can be 1, 2 and 3 steps away from the start state. Therefore, in some implementations, the forward (backward) probabilities on the larger (smaller) triangles can only be computed after the ones on the smaller (larger) triangles have been computed. A naive implementation can require 3 nested loops to compute the recursions in equations (5) and (6). In general, the number of nested loops needed can be equal to the number of streams (S).

Figure 3B:
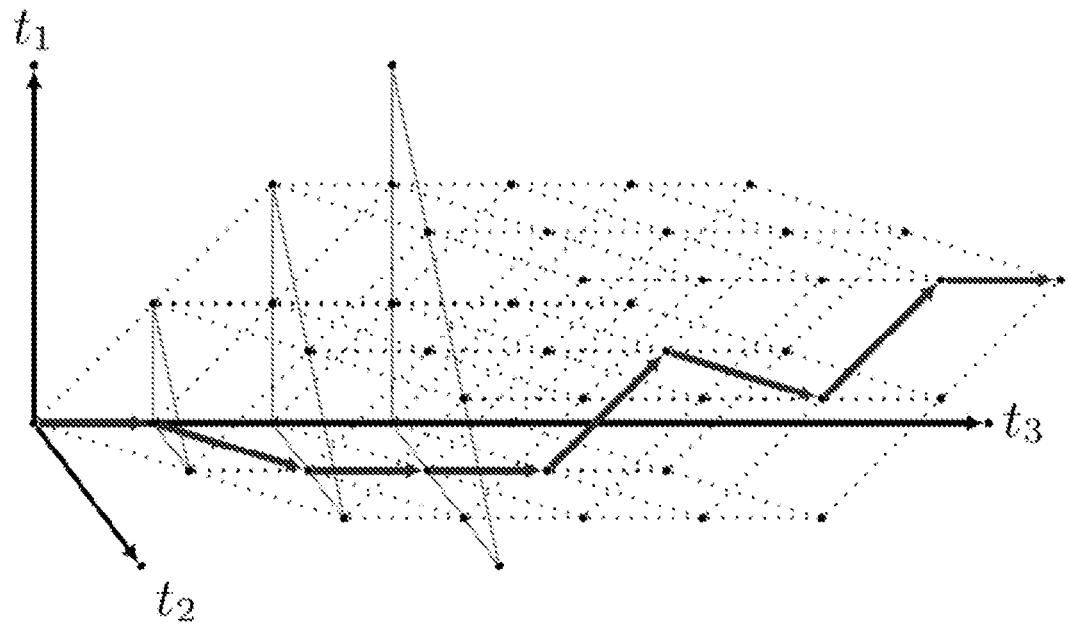
FIG. 3B illustrates a three dimensional skewed grid arrangements of states which can be used in training a MS RNN-T in accordance with various implementations disclosed herein.

It can be shown that a loop-skewing trick can be applied to compute the forward-backward recursions in a single loop to maximize compute parallelism. The same trick can also be applied to multi-stream RNN-T. FIG. 3B shows the positions of the states after loop-skewing is applied. Note that the triangles are now aligned with the $t_1$-$t_2$ plane and $t_3$ can indicate the number of steps to reach the states from the start state. In some implementations, all the forward and backward probabilities for the states in the same $t_1$-$t_2$ plane can be computed in parallel and only a single loop is needed along the $t_3$ axis. In some implementations, In general, states that can be reached with the same number of steps can be grouped into a S—1-dimensional hyper-plane.

| Algorithm 1 Beam Search Algorithm for multi - stream RNN - T |
|---|
| 1.     procedure BeamSearchDecode($x_1^{(S)}, x_2^{(S)}, \ldots, x_{T_S}^{(S)}$, K) |
| 2.         for each stream s do |
| 3.             if s is input stream then |
| 4.                 $x^{(s)} \leftarrow$ first input vector |
| 5.             else |
| 6.                 $x^{(s)} \leftarrow$ start - of - sequence symbol |
| 7.             initialize $h^{(s)}$ and $r^{(s)}$ using equation (2) |
| 8.         B $\leftarrow$ [state = \{$x^{(s)}, h^{(s)}, r^{(s)}$\}, score = 0] |
| 9.         while end - of - sequence symbols not emitted do |
| 10.             $\bar{B} \leftarrow$ empty list |
| 11.             for each beam entry b $\in$ B do |
| 12.                 for each next output label $y^*$ do |
| 13.                     determine the stream $s^*$ for $y^*$ |
| 14.                     if $s^*$ is input stream then |
| 15.                         $x^{(s^*)} \leftarrow$ next input vector |
| 16.                     else |
| 17.                         $x^{(s^*)} = y^*$ |
| 18.                     update $h^{(s^*)}$ and $r^{(s^*)}$ using equation (2) |
| 19.                     update new score, p, using equation (1) |
| 20.                     $\bar{B}$ += [\{$x^{(s)}, h^{(s)}, r^{(s)}$\}, score = p] |
| 21.         B $\leftarrow$ SortAndPrune($\bar{B}$, K) |

In some implementations, a beam search decoding algorithm (illustrated in Algorithm 1) can be used for a multi-stream RNN-T model. In some implementations, the inputs to the encoders can be initialized with the first input vector for input streams (line 4) or a start-of-sequence symbol for output streams (line 6). $h^{(s)}$ and $r^{(s)}$ can be computed for all the streams using equation (2) (line 7). The beam stack, B, can be initialized with a single entry for the start states and zero score (line 8). In some implementations, the decoder enters a loop that repeatedly expand each entry in B with all possible next output label, $y^*$. For each $y^*$, the corresponding stream can be determined as $s^*$. $x^{(s^*)}$, $h^{(s^*)}$, and $r^{(s^*)}$ can be updated for stream $s^*$ (lines 15, 17 and 18). The score can be updated (line 19) and a new entry can be added to the new beam stack, B (line 20). The new beam stack can be sorted and pruned by score to keep at most K entries, where K is the beam size. The decoding loop can terminate when all the streams have emitted the end-of-sequence symbol.

FIG. 1 illustrates an example MS RNN-T in accordance with various implementations disclosed herein. In some implementations, MS RNN-T 100 can be used to process a single input stream to generate two or more output streams. Additionally or alternatively, MS RNN-T 100 can be used to process at least two input streams to generate a single output stream. As an illustrative example, FIG. 1 will be described with respect to processing audio data capturing an utterance to generate a phoneme sequence and a grapheme sequence. In other words, FIG. 1 will be described with respect a single input stream (i.e., audio data capturing an utterance), a first output stream (i.e., the generated phoneme sequence), and a second output stream (i.e., the generated grapheme sequence). However, this is merely an example and is not meant to be limiting. In some implementations, the first stream of MS RNN-T 100 can be an input stream corresponding to the audio data capturing the spoken utterance, where the first stream includes stream 1 input 106 (i.e., the input stream sequence), encoder 1 112, and state vector 1 118 (i.e., the encoded representation of the input stream sequence). In some implementations, the second stream can be the first output stream corresponding to the generated phoneme sequence, where the second stream can include stream 2 input 108 (i.e., the first output stream sequence), encoder 2 114, and state vector 2 120 (i.e., the encoded representation of the first output stream sequence). Additionally or alternatively, the Nth stream can be the second output stream corresponding to the generated grapheme sequence, where the Nth stream includes stream N input 110 (i.e., the second output stream sequence), encoder N 116, and state vector N 122 (i.e., the encoded representation of the second output stream sequence). In some implementations, a stream includes at least stream input, an encoder, and output generated using the encoder.

MS RNN-T 100 can process one or more segments of an input sequence 102. For example, input sequence 102 can be audio data capturing a spoken utterance. In an initial iteration, stream selector 104 can assign an initial segment of input sequence 102 to stream 1 input 106. Stream 1 input 106 can be processed using encoder 1 to generate state vector 1 118, where state vector 1 118 is an embedding representation of stream 1 input 106. In the illustrated example, no output has been generated at the initial iteration, thus stream 2 input 116 is empty and stream N input 110 is empty. Encoder 2 114 can process the empty stream 2 input 108 to generate state vector 2 120 representing the empty input. Similarly, encoder N 114 can be used to process empty stream N input 110 to generate state vector N representing the empty input.

In some implementations, joint network 124 can process (1) state vector 1 118, (2) state vector 2 120, and (3) state vector N 122 to generate predicted label 126. In other words, joint network 124 can act as a decoder to generate predicted output by processing the encoded representations generated using encoders 1-N. In some implementations, predicted label 126 is the output corresponding to one of the output streams. For example, predicted label 126 can be a phoneme for the generated phoneme sequence, or predicted label 126 can be a grapheme for the generated grapheme sequence.

At subsequent iterations, stream selector 104 can update stream 1 input 106 with the next segment in input sequence 102. Additionally or alternatively, stream selector 104 can update stream 2 input 108 and/or stream N input 110 (i.e., update one or both of the output streams) based on the predicted label 126 generated at the previous iteration. Encoder 1 112 can process updated stream 1 input 106 to generate updated state vector 1 118; encoder 2 114 can process (updated) stream 2 input 108 to generate (updated) state vector 2 120; and encoder N 116 can process (updated) stream N input 110 to generate (updated) state vector N 122. In some implementations, only one output stream is updated in an iteration. In other words, the predicted label generated at the previous iteration is used to update either stream 2 input 108 or stream N input 110 but not both. In some implementations, both output streams can be updated based on the predicted label 126 generated at a previous iteration. For example, stream 2 input 108 can be updated based on predicted label 126 and stream N input 110 can be updated with a placeholder as the next segment in the sequence (e.g., updated with NULL as the next segment in the sequence, and/or updated with an additional value as the next segment in the sequence indicating predicted label 126 generated at the previous iteration was not used to update the sequence). Joint network 124 can process updated state vector 1 118, (updated) state vector 2 120, and (updated) state vector N 122 to generate an additional predicted label 126. This additional predicted label 126 can be used to update output stream(s) in a subsequent iteration.

MS RNN-T 100 has been described with respect to a single input stream and two output streams. Additional and/or alternative MS RNN-T configurations can be utilized. For example, a three stream MS RNN-T can include two input streams and a single output stream, where encoder 1 112 corresponds with the first input stream, encoder 2 114 corresponds with the second input stream, and encoder N 114 corresponds with the output stream. Additional and/or alternative numbers of streams may be utilized. For example, a four stream MS RNN-T can include two input streams and two output streams, where encoder 1 112 corresponds with the first input stream, encoder 2 114 corresponds with the second input stream, encoder 3 (not depicted) corresponds with the first output stream, and encoder N 116 corresponds with the second output stream.

Figure 2:
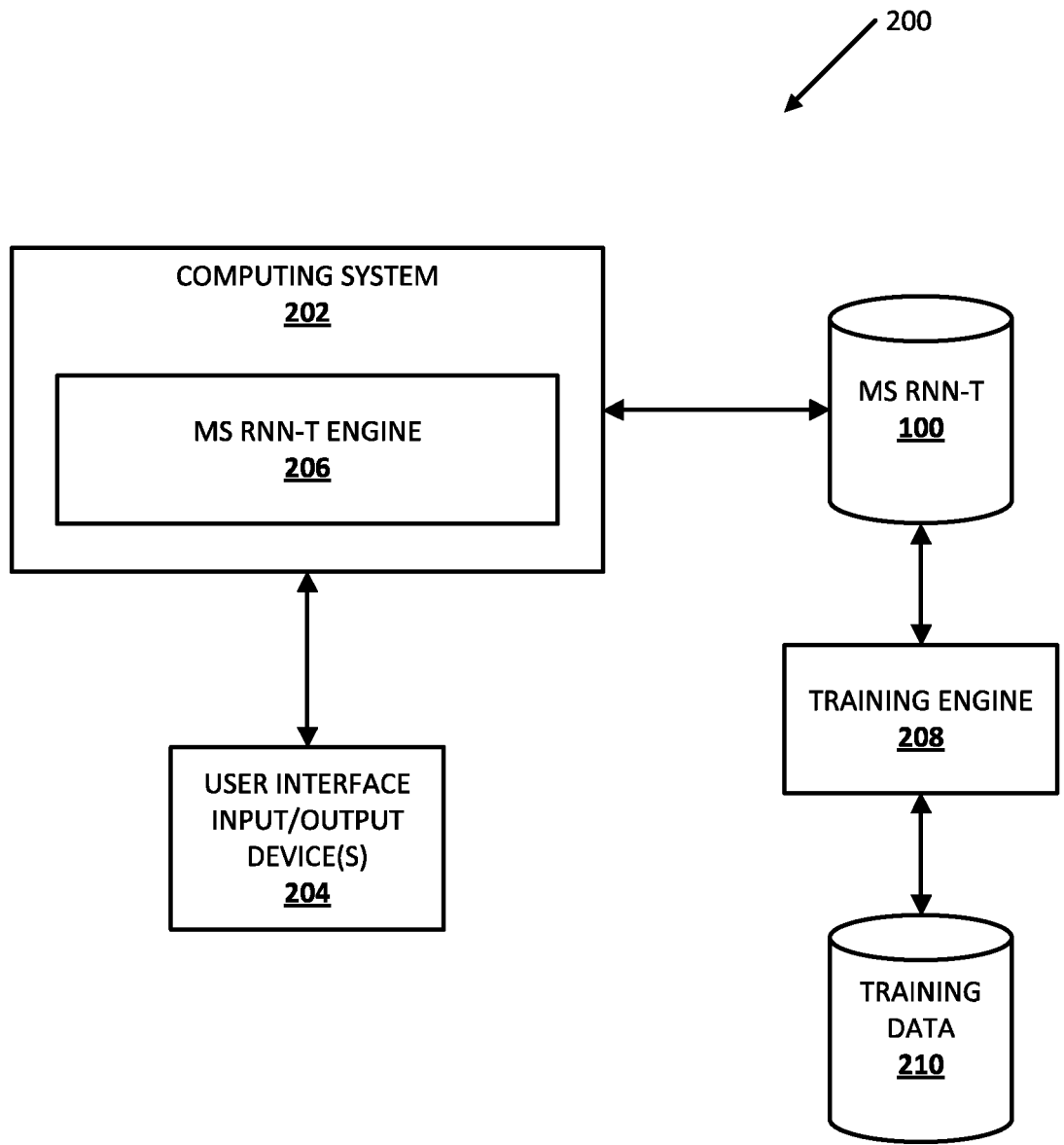
FIG. 2 illustrates an example environment where various implementations disclosed herein can be implemented.

FIG. 2 illustrates an example environment in which various implementations disclosed herein may be implemented. Example environment 200 includes computing system 202 which can include MS RNN-T engine 206, MS RNN-T 100, training engine 208, training data 210 additional or alternative engine(s) (not depicted), and/or additional or alternative model(s) (not depicted. Additionally or alternatively, computing system 202 may be associated with one or more user interface input/output devices 204. For example, as described with respect to FIG. 1, MS RNN-T 100 can include one encoder per stream as well as a shared joint network.

In some implementations, computing system 202 may include user interface input/output devices (not depicted), which may include, for example, a physical keyboard, a touch screen (e.g., implementing a virtual keyboard or other textual input mechanisms), a microphone, a camera, a display screen, and/or speaker(s). The user interface input/ output devices may be incorporated with one or more computing system 202 of a user. For example, a mobile phone of the user may include the user interface input output devices; a standalone digital assistant hardware device may include the user interface input/output device; a first computing device may include the user interface input device(s) and a separate computing device may include the user interface output device(s); etc. In some implementations, all or aspects of computing system 202 may be implemented on a computing system that also contains the user interface input/output devices. In some implementations computing system 202 may include an automated assistant (not depicted), and all or aspects of the automated assistant may be implemented on computing device(s) that are separate and remote from the client device that contains the user interface input/output devices (e.g., all or aspects may be implemented "in the cloud"). In some of those implementations, those aspects of the automated assistant may communicate with the computing device via one or more networks such as a local area network (LAN) and/or a wide area network (WAN) (e.g., the Internet).

Some non-limiting examples of computing system 202 include one or more of: a desktop computing device, a laptop computing device, a standalone hardware device at least in part dedicated to an automated assistant, a tablet computing device, a mobile phone computing device, a computing device of a vehicle (e.g., an in-vehicle communications system, and in-vehicle entertainment system, an in-vehicle navigation system, an in-vehicle navigation system), or a wearable apparatus of the user that includes a computing device (e.g., a watch of the user having a computing device, glasses of the user having a computing device, a virtual or augmented reality computing device). Additional and/or alternative computing systems may be provided. Computing system 202 may include one or more memories for storage of data and software applications, one or more processors for accessing data and executing applications, and other components that facilitate communication over a network. The operations performed by computing system 202 may be distributed across multiple computing devices. For example, computing programs running on one or more computers in one or more locations can be coupled to each other through a network.

As illustrated in FIG. 2, training engine 208 can train MS RNN-T 100 based on training data 210. In some implementations, training engine 208 can train MS RNN-T 100 using a forward-backward algorithm. In some of those implementations, training engine 208 can use the loop-skewing trick to reduce the dimensionality of the training, when training MS RNN-T 100 using the forward-backward algorithm. In some implementations, training engine 208 can train MS RNN-T 100 using unaligned training data 210.

In some implementations, MS RNN-T engine 206 can process user interface input using MS RNN-T 100 to generate output, such as processing user interface input captured using one or more of user interface input/output devices 204. In some implementations, MS RNN-T engine 206 can process two or more input sequences using MS RNN-T 100 to generate output. In some implementations, MS RNN-T engine 206 can process user interface input using MS RNN-T 100 to generate two or more output sequences. In some implementations, MS RNN-T engine 206 can provide generated output for display via one or more user interface output devices 208. For example, MS RNN-T engine 208 can provide a text representation of speech spoken by a first speaker and a text representation of speech spoken by a second speaker for display via a display screen of computing system 202.

Figure 4:
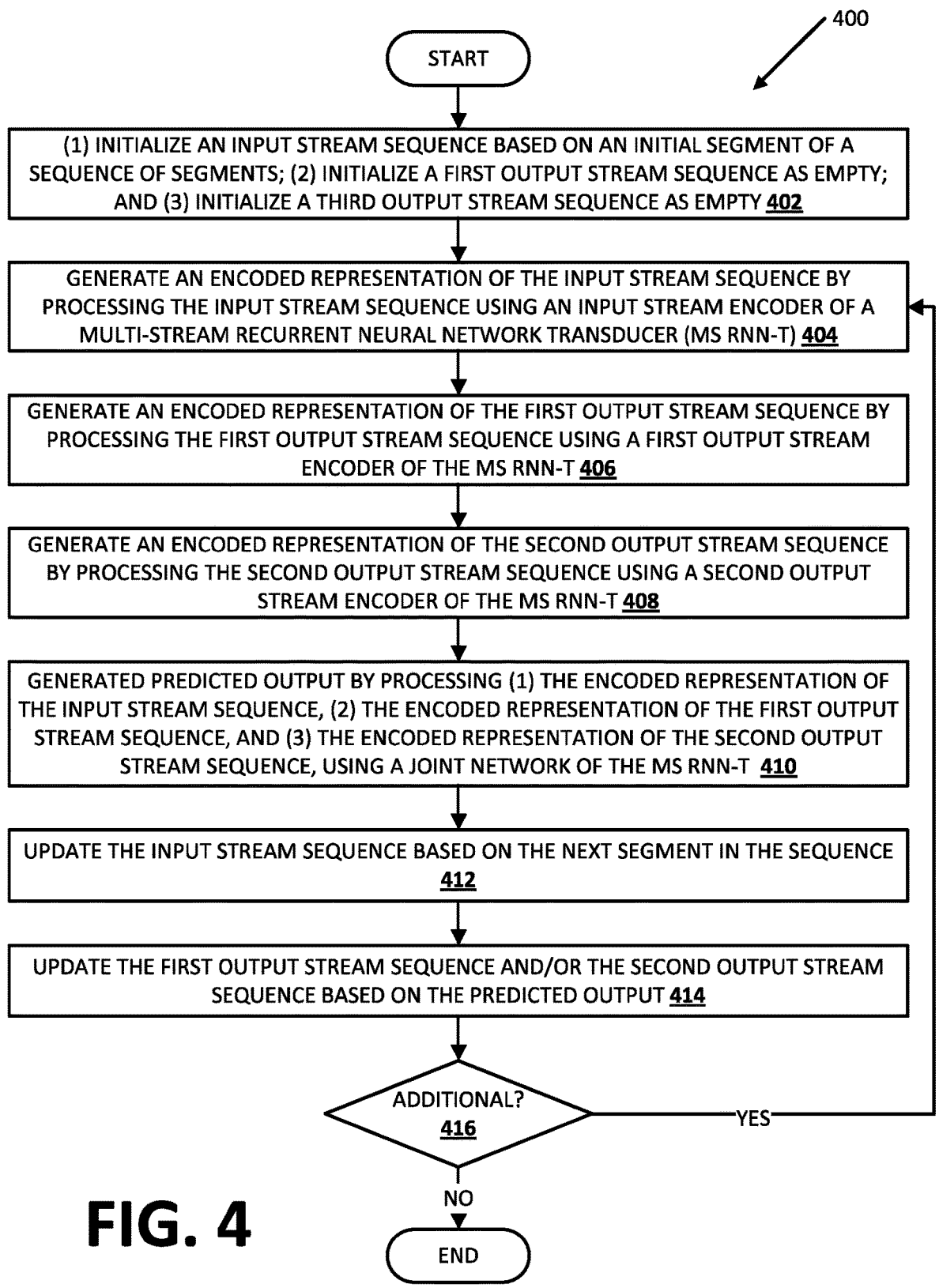
FIG. 4 is a flowchart illustrating an example process in accordance with implementations disclosed herein.

FIG. 4 is a flowchart illustrating a process 400 of generating two or more output stream sequences by processing at least one input stream sequence using a MS RNN-T in accordance with implementations disclosed herein. For convenience, the operations of the flowchart are described with reference to a system that performs the operations. This system may include various components of various computer systems, such as one or more components of computing system 202, client device 602, and/or computing system 710. Moreover, while operations of process 400 are shown in a particular order, this is not meant to be limiting. One or more operations may be reordered, omitted, and/or added.

At block 402, the system initializes (1) an input stream sequence based on an initial segment of a sequence of segments; (2) a first output stream sequence as empty; and (3) a second output stream sequence as empty. For example, the system can initialize the input stream sequence based on the first segment in sequence of audio data capturing an utterance. In some implementations, the utterance can capture a single speaker speaking a single language. In some implementations, the utterance can capture a single speaker speaking in multiple languages. In some implementations, the utterance can capture multiple speakers speaking in one or more languages. Additional and/or alternative input can be used to initialize the input stream sequence.

At block 404, the system generates an encoded representation of the input stream sequence by processing the input stream sequence using an input stream encoder of a MS RNN-T.

At block 406, the system generates an encoded representation of the first output stream sequence by processing the first output stream sequence using a first output stream encoder of the MS RNN-T. In some implementations, at an initial iteration (i.e., when the first output stream sequence has been initialized to empty) generating an encoded representation of the first output stream sequence includes generating the encoded representation of the empty sequence by processing the empty first output stream sequence using the first output stream encoder. In some implementations, at an initial iteration, generating the encoded representation of the empty first output stream sequence comprises retrieving a previously generated encoded representation of the empty sequence.

At block 408, the system generates an encoded representation of the second output stream sequence by processing the second output stream sequence using a second output stream encoder of the MS RNN-T. In some implementations, at an initial iteration (i.e., when the second output stream sequence has been initialized to empty) generating an encoded representation of the second output stream sequence includes generating the encoded representation of the empty sequence by processing the empty second output stream sequence using the second output stream encoder. In some implementations, at an initial iteration, generating the encoded representation of the empty second output stream sequence comprises retrieving a previously generated encoded representation of the empty sequence. In some implementations, the second output stream encoder can have the same (or a substantially similar) structure as the first output stream encoder. For example, a MS RNN-T can be used to generate a text representation of speech of a first speaker and a text representation of speech of a second speaker. Both the first output stream (used to generate a text representation of speech of the first speaker) and the second output stream (used to generate a text representation of speech of the second speaker) are used to generate text representations of speakers. In some implementations, the first output stream encoder and the second output stream encoder can have the same (or substantially similar) network structures due to both encoders performing the same (or substantially similar) task. In contrast, a MS RNN-T can be used to generate a phoneme sequence and a grapheme sequence of an utterance. The first output stream encoder is used to generate a phoneme sequence and the second output stream encoder is used to generate a grapheme sequence, and are thus performing different tasks. In some implementations, the first output stream encoder can have a different structure than the second output stream encoder so the first output stream encoder can process the first output stream sequence of phonemes (and similarly the second output stream encoder can process the second output stream sequence of graphemes).

At block 410, the system generates predicted output by processing (1) the encoded representation of the first output stream sequence, (2) the encoded representation of the first output stream sequence, and (3) the encoded representation of the second output stream sequence, using a joint network of the MS RNN-T. In some implementations, at the first iteration, the encoded representation of the first output stream sequence and/or the encoded representation of the second output stream sequence can be an encoded representation of an empty sequence. In some of those implementations, the predicted output generated at the first iteration can be based only on the encoded representation of the input stream.

At block 412, the system updates the input stream sequence based on the next segment in the sequence. For example, the system can update the first input stream sequence by adding the next item in sequence of segments as the next item in the input stream sequence.

At block 414, the system updates the first output stream sequence and/or the second output stream sequence based on the predicted output. In some implementations, the predicted output can be added to the corresponding output stream sequence. For example, when the predicted output is a phoneme, the predicted output can be added to the output stream used in generating the phoneme representation of an utterance. In some implementations, nothing is added to an additional output stream. For example, when a phoneme is added to the output stream sequence corresponding to the phoneme sequence, nothing can be added to the output stream sequence corresponding to the grapheme sequence. Additionally or alternatively, in some implementations, an indication can be added to an output stream sequence indicating the predicted output was not added to the output stream sequence in the current iteration. For example, a phoneme predicted output can be added to an output stream sequence of phonemes, while a "-" can be added to the output stream sequence of graphemes. Additional and/or alternative indications that predicted output was not added to an output stream sequence can be utilized (e.g., NULL, 0, *, etc.). In some implementations, the first output sequence can include a smaller number of items than the second output sequence. For example, the first output sequence can include 4 items in the sequence while the second output sequence can include 10 items in the sequence. In some implementations, the first output sequence can include the same number of items as the second output sequence.

At block 416, the system determines whether to generate additional predicted output. If so, the system proceeds back to block 404 and the system generates an encoded representation of the updated input stream at block 404, generates an encoded representation of the (updated) first output stream at block 406, generates an encoded representation of the (updated) second output stream at block 408, before generating additional predicted output based on the encoded representation of the updated streams at block 410. If not, the process ends. In some implementations, the system can determine to not generate additional predicted output when an end of sequence token is encountered in the input stream sequence, when an end of sequence token is generated for the first output stream, when an end of sequence token is generated for the second output stream, when an end of sequence token is generated for the first output stream and an end of sequence token is generated for the second output stream, and/or when one or more additional conditions are satisfied. In some implementations, the system can be trained to predict an end of sequence token for an output stream before the system makes a determination that a speaker has finished speaking (e.g., before a microphone of a client device has closed). In some of those implementations, determining a predicted end of sequence token is present in one or more output stream sequences can provide an indication that a user has finished speaking before the system can determine an end of sequence token is present in the input stream sequence. Thus determining an end of sequence token in an output stream sequence can cause the system to not generate additional predicted output.

In some implementations, process 400 of FIG. 4 can be used in generating a text representation of speech spoken by a first speaker and a text representation of speech spoken by a second speaker based on audio data capturing overlapping speech by the first speaker and the second speaker. For example, at block 402, the system can initialize an input stream sequence based on an initial segment of a sequence of the audio data capturing the overlapping speech. A block 410, the system can generate predicted output, where the predicted output is a portion of the text representation of the speech spoken by the first speaker or the speech spoken by the second speaker. In some implementations, the corresponding speaker stream can be determined directly based on the predicted output. For example, the first speaker and the second speaker can be speaking in different languages which use different alphabets (e.g., the first speaker is speaking in English and the second speaker is speaking in Mandarin, the first speaker is speaking in Spanish and the second speaker is speaking in Russian, etc.). The system can determine the corresponding generated speaker stream for the predicted output based on the alphabet of the predicted output. Additionally or alternatively, the system can perform additional processing in the predicted output, such as by processing the predicted output using stream selector 104 as illustrated in FIG. 4. In some implementations, the stream selector can include one or more additional models trained to determine whether the predicted output is associated with the first speaker or the second speaker.

In some implementations, process 400 of FIG. 4 can be used in generating a phoneme sequence and a grapheme sequence corresponding to a spoken utterance. For example, at block 402, the system can initialize the input stream sequence based on an initial segment in a sequence of audio data capturing the spoken utterance. In some implementations, at block 410, the system can generate one or more phonemes or one or more graphemes as predicted output. Phonemes and graphemes can have different structures. For example, a phoneme sequence for the word Melvin can be "/m/, /eh/, /l/, /v/, /ih/, /n/" and the corresponding grapheme sequence can be "m e l v i n". The system can determine whether to update the phoneme sequence or the grapheme sequence based on the structure of the predicted output. In some implementations, the phoneme sequence can indicate the particular pronunciation of the utterance by the speaker, even when it is not the most common pronunciation.

In some implementations, process 400 of FIG. 4 can be used in generating a text representation of speech in a first language and a text representation of speech in a second language by processing an utterance including one or more portions of speech spoken in the first language by a speaker and one or more portions of speech spoken in the second language by the user. In some implementations, the speaker can blend the first language and the second language. For example, the audio data can capture an utterance in two languages of "[French word 1] [French word 2] [Spanish word 1] [French word 3] [Spanish word 2] [French word 4]". In some implementations, the text representation of the portions in French can be "[French word 1] [French word 2] [French word 3] [French word 4]", and the text representation of the portions in Spanish can be "[Spanish word 1] [Spanish word 2]". In some implementations, the text representation of the first language can be displayed separately from the text representation of the second language. Additionally or alternatively, in some implementations, the system can display words in both languages as they are generated, thus blending the words in the first language with the words in the second language in output.

Figure 5:
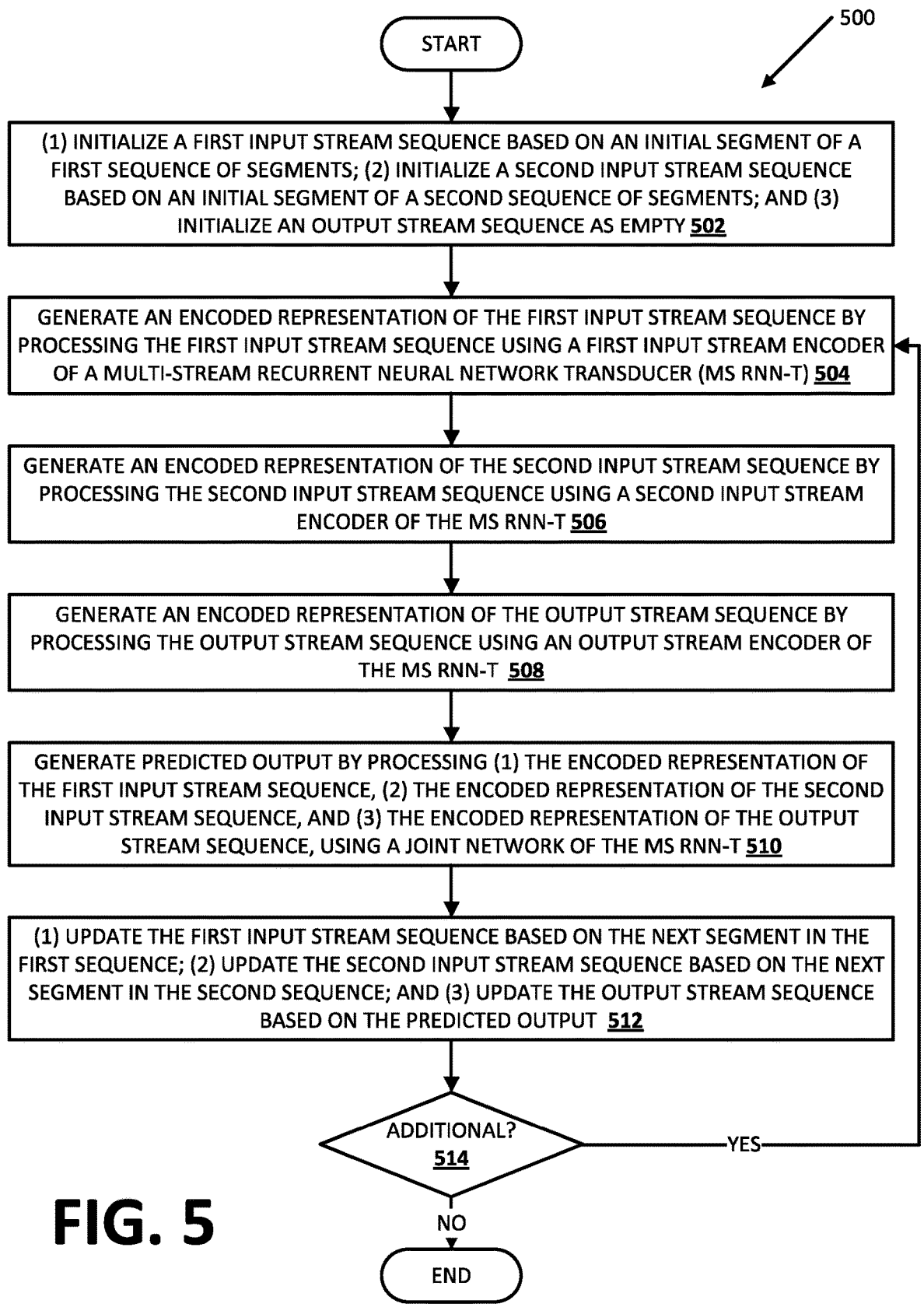
FIG. 5 is a flowchart illustrating another example process in accordance with implementations disclosed herein.

FIG. 5 is a flowchart illustrating a process 500 of generating at least one output stream sequence by processing at least two input stream sequences using a MS RNN-T in accordance with implementations disclosed herein. For convenience, the operations of the flowchart are described with reference to a system that performs the operations. This system may include various components of various computer systems, such as one or more components of computing system 202, client device 602, and/or computing system 710. Moreover, while operations of process 500 are shown in a particular order, this is not meant to be limiting. One or more operations may be reordered, omitted, and/or added.

At block 502, the system initializes: (1) a first input stream sequence based on an initial segment of a first sequence of segments, (2) a second input stream sequence based on an initial segment of a second sequence of segments, and (3) an output stream sequence as empty. For example, a MS RNN-T can be used to generate a text representation of audio data captured using a first audio channel and a second audio channel. The first input stream sequence can be initialized based on the first segment of a sequence of audio data from the first second channel. The second input stream sequence can be initialized based on the first segment of a sequence of audio data from the second audio channel. In some implementations, the second input stream sequence can be initialized as empty, when the system captures the first type of user interface input data before it captures the second type of user interface input data. For example, the system can process audio data and gesture data to generate a representation of a command indicated by the audio data and the gesture data. In some implementations, a user can begin speaking before they begin performing a gesture (or begin performing a gesture before they begin speaking). In some of those implementations, the system can initialize the first input stream sequence based on the audio data (or the gesture data) and can initialize the second input stream sequence as empty.

At block 504, the system generates an encoded representation of the first input stream sequence by processing the first input stream sequence using a first input stream encoder of the MS RNN-T.

At block 506, the system generates an encoded representation of the second input stream sequence by processing the second input stream sequence using a second input stream encoder of the MS RNN-T. In some implementations, the second input stream encoder can have the same (or substantially similar) structure as the first input stream encoder. For example, when the first output stream encoder and the second output stream encoder are both processing input audio data from different audio channels, the encoders are performing similar tasks (i.e., encoding audio data captured at one audio channel). In some of those implementations, the first input stream encoder and the second input stream encoder can have the same (or substantially similar) structures. Additionally or alternatively, in some implementations, the first input stream encoder can have a different structure from the second input stream encoder. For example, a first input stream encoder used to process a first input sequence capturing audio data can have a different structure from a second input stream encoder used to process gesture data.

At block 508, the system generates an encoded representation of the output stream sequence by processing the output stream sequence using an output stream encoder of the MS RNN-T. In some implementations, at an initial iteration (i.e., when the output stream sequence has been initialized to empty) generating an encoded representation of the output stream sequence includes generating the encoded representation of the empty sequence by processing the empty output stream sequence using the output stream encoder. In some implementations, at an initial iteration, generating the encoded representation of the empty output stream sequence comprises retrieving a previously generated encoded representation of the empty sequence.

At block 510, the system generates predicted output by processing (1) the encoded representation of the first input stream sequence, (2) the encoded representation of the second input stream sequence, and (3) the encoded representation of the output stream sequence, using a joint network of the MS RNN-T.

At block 512, the system updates (1) the first input stream sequence based on the next segment in the first sequence, (2) the second input stream sequence based on the next segment in the second sequence, and (3) the output stream sequence based on the predicted output.

At block 514, the system determines whether to generate additional predicted output. If the system determines to generate additional predicted output, the system can proceed back to block 504, generate an additional encoded representation of the updated first input stream sequence at block 504, generate an additional encoded representation of the updated second input stream sequence at block 506, generate an additional encoded representation of the updated output sequence at block 508, and generate additional predicted output based on the updated input stream sequences at block 510. If not, the process ends. In some implementations, the system can determine to not generate additional predicted output when an end of sequence token is encountered in the first input stream sequence, an end of sequence token is encountered in the second input stream sequence, an end of sequence token is encountered in the first input stream sequence and an end of sequence token is encountered in the second input stream sequence, an end of sequence token is encountered in the output stream sequence, and/or when one or more additional or alternative conditions are satisfied.

In some implementations, process 500 of FIG. 5 can be used in generating a text representation of audio data captured using a first audio channel and a second audio channel. For example, at block 502, the system can initialize the first input stream sequence based on an initial segment in a sequence of audio data from the first audio channel, and the system can initialize the second input stream sequence based on an initial segment in a second of audio data in the second audio channel. In some implementations, at block 510, the system can generate a text representation of the audio data captured in the first audio channel and the second audio channel.

In some implementations, process 500 of FIG. 5 can be used in generating a representation of a user command captured in both a spoken utterance and a gesture. For example, at block 502, the system can initialize a first input stream sequence based on an initial segment in a sequence of audio data capturing an utterance, and the system can initialize a second input stream sequence based on an initial segment in a sequence of gesture data capturing a gesture. In some implementations, at block 510, the system can generate the representation of the user command.

Figure 6:
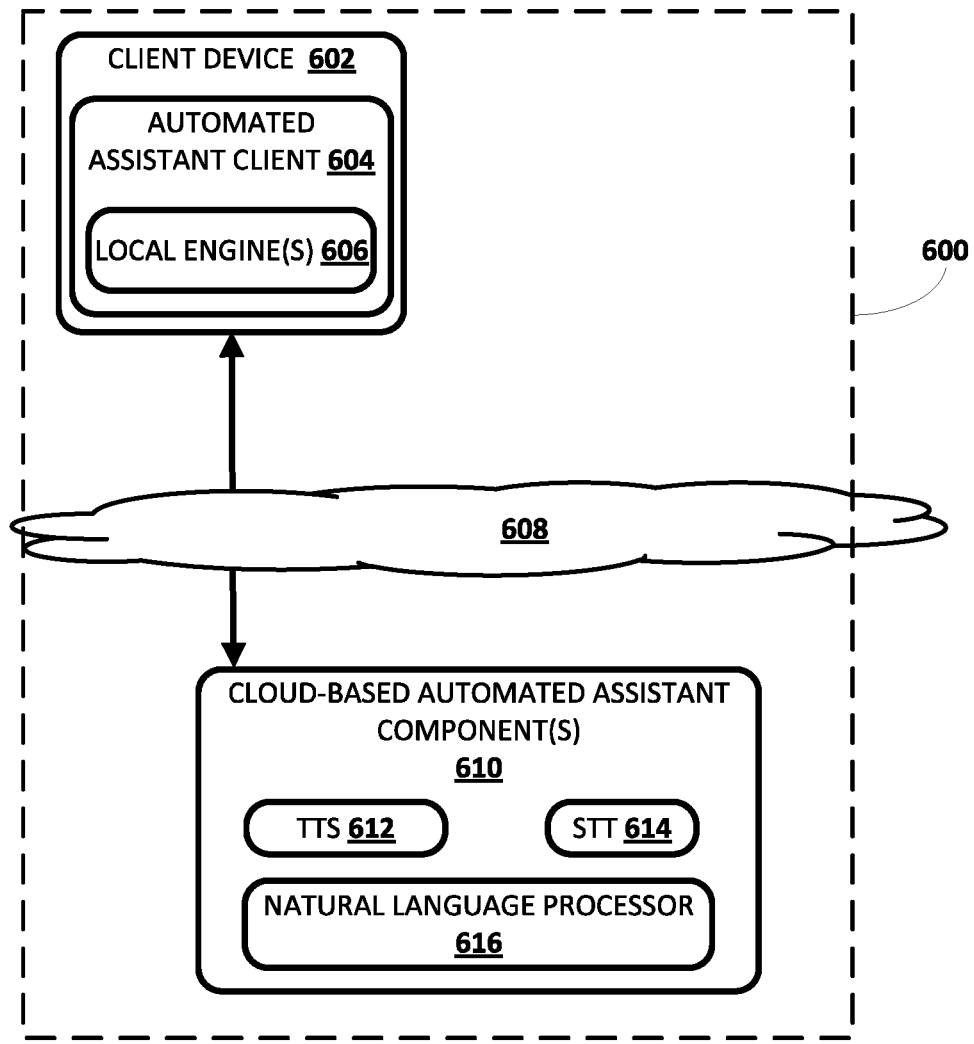
FIG. 6 illustrates another example environment in which implementations disclosed herein can be implemented.

Turning to FIG. 6, an example environment in which implementations disclosed herein can be implemented. FIG. 6 includes a client computing device 602, which executes an instance of an automated assistant client 604. One or more cloud-based automated assistant components 610 can be implemented on one or more computing systems (collectively referred to as a "cloud" computing system) that are communicatively coupled to client device 602 via one or more local and/or wide area networks (e.g., the Internet) indicated generally at 608.

An instance of an automated assistant client 604, by way of its interactions with one or more cloud-based automated assistant components 610, may form what appears to be, from the user's perspective, a logical instance of an automated assistant 600 with which the user may engage in a human-to-computer dialog. It thus should be understood that in some implementations, a user that engages with an automated assistant client 604 executing on client device 602 may, in effect, engage with his or her own logical instance of an automated assistant 600. For the sake of brevity and simplicity, the term "automated assistant" as used herein as "serving" a particular user will often refer to the combination of an automated assistant client 604 executing on a client device 602 operated by the user and one or more cloud-based automated assistant components 610 (which may be shared amongst multiple automated assistant clients of multiple client computing devices). It should also be understood that in some implementations, automated assistant 600 may respond to a request from any user regardless of whether the user is actually "served" by that particular instance of automated assistant 600.

The client computing device 602 may be, for example: a desktop computing device, a laptop computing device, a tablet computing device, a mobile smartphone computing device, a standalone interactive speaker, a smart appliance, and/or a wearable apparatus of the user that includes a computing device (e.g., a watch of the user having a computing device, glasses of the user having a computing device, a virtual or augmented reality computing device). Additional and/or alternative client computing devices may be provided. Additionally or alternatively, operations of client computing device 602 may be distributed between multiple computing devices. For example, one or more operations of client computing device 602 may be distributed between a mobile smartphone and a vehicle computing device. Furthermore, operations of client computing device 602 may be repeated between multiple computing devices (which in some cases may be communicatively coupled). As a further example, a mobile smartphone as well as a vehicle interface device may each implement operations of automated assistant 600, such as a mobile smartphone and a vehicle interface device both including an invocation engine (described below). In various implementations, the client computing device 602 may optionally operate one or more other applications that are in addition to automated assistant client 1304, such as a message exchange client (e.g., SMS, MMS, online chat), a browser, and so forth. In some of those various implementations, one or more of the other applications can optionally interface (e.g. via an application programming interface) with the automated assistant 604, or include their own instance of an automated assistant application (that may also interface with the cloud-based automated assistant component(s) 610).

Automated assistant 600 engages in human-to-computer dialog sessions with a user via user interface input and output devices of the client device (not pictured). To preserve user privacy and/or to conserve resources, in many situations a user must often explicitly invoke the automated assistant 600 before the automated assistant will fully process a spoken utterance. The explicit invocation of the automated assistant 600 can occur in response to certain user interface input received at the client device 602. For example, user interface inputs that can invoke the automated assistant 600 via the client device 602 can optionally include actuations of a hardware and/or virtual button of the client device 602. Moreover, the automated assistant client can include one or more local engines 606, such as an invocation engine that is operable to detect the presence of one or more spoken invocation phrases. The invocation engine can invoke the automated assistant 600 in response to detection of one or more of the spoken invocation phrases. For example, the invocation engine can invoke the automated assistant 600 in response to detecting a spoken invocation phrase such as "Hey Assistant", "OK Assistant", and/or "Assistant". The invocation engine can continuously process (e.g., if not in an "inactive" mode) a stream of audio data frames that are based on output from one or more microphones of the client device 602, to monitor for an occurrence of a spoken invocation phrase. While monitoring for the occurrence of the spoken invocation phrase, the invocation engine discards (e.g., after temporary storage in a buffer) any audio data frames that do not include the spoken invocation phrase. However, when the invocation engine detects an occurrence of a spoken invocation phrase in processed audio data frames, the invocation engine can invoke the automated assistant 600. As used herein, "invoking" the automated assistant 600 can include causing one or more previously inactive functions of the automated assistant 600 to be activated. For example, invoking the automated assistant 600 can include causing one or more local engines 606 and/or cloud-based automated assistant components 610 to further process audio data frames based on which the invocation phrase was detected, and/or one or more following audio data frames (whereas prior to invoking no further processing of audio data frames was occurring).

The one or more local engine(s) 606 of automated assistant client 604 are optional, and can include, for example, the invocation engine described above, a local speech-to-text ("STT") engine (that converts captured audio to text), a local text-to-speech ("TTS") engine (that converts text to speech), a local natural language processor (that determines semantic meaning of audio and/or text converted from audio), and/or other local components. Because the client device 602 is relatively constrained in terms of computing resources (e.g., processor cycles, memory, battery, etc.), the local engines 606 may have limited functionality relative to any counterparts that are included in cloud-based automated assistant components 610. Automated assistant client 604 can additionally include an MS RNN-T engine (not depicted). The MS RNN-T engine, such as MS RNN-T engine 206 of FIG. 2 can be used by automated assistant client 604 to generate predicted output using a MS RNN-T model (not depicted).

Cloud-based automated assistant components 610 leverage the virtually limitless resources of the cloud to perform more robust and/or more accurate processing of audio data, and/or other user interface input, relative to any counterparts of the local engine(s) 606. Again, in various implementations, the client device 602 can provide audio data and/or other data to the cloud-based automated assistant components 610 in response to the invocation engine detecting a spoken invocation phrase, or detecting some other explicit invocation of the automated assistant 600.

The illustrated cloud-based automated assistant components 610 include a cloud-based TTS module 612, a cloud-based STT module 614, and a natural language processor 616. In some implementations, one or more of the engines and/or modules of automated assistant 600 may be omitted, combined, and/or implemented in a component that is separate from automated assistant 600. Further, in some implementations automated assistant 600 can include additional and/or alternative engines and/or modules.

Cloud-based STT module 614 can convert audio data into text, which may then be provided to natural language processor 616. In various implementations, the cloud-based STT module 614 can convert audio data into text based at least in part on indications of speaker labels and assignments that are provided by an assignment engine (not illustrated).

Cloud-based TTS module 612 can convert textual data (e.g., natural language responses formulated by automated assistant 600) into computer-generated speech output. In some implementations, TTS module 612 may provide the computer-generated speech output to client device 602 to be output directly, e.g., using one or more speakers. In other implementations, textual data (e.g., natural language responses) generated by automated assistant 600 may be provided to one of the local engine(s) 606, which may then convert the textual data into computer-generated speech that is output locally.

Natural language processor 616 of automated assistant 600 processes free form natural language input and generates, based on the natural language input, annotated output for use by one or more other components of the automated assistant 600. For example, the natural language processor 616 can process natural language free-form input that is textual input that is a conversion, by STT module 614, of audio data provided by a user via client device 602. The generated annotated output may include one or more annotations of the natural language input and optionally one or more (e.g., all) of the terms of the natural language input. In some implementations, the natural language processor 616 is configured to identify and annotate various types of grammatical information in natural language input. For example, the natural language processor 616 may include a part of a speech tagger (not depicted) configured to annotate terms with their grammatical roles. Also, for example, in some implementations the natural language processor 616 may additionally and/or alternatively include a dependency parser (not depicted) configured to determine syntactic relationships between terms in natural language input.

In some implementations, the natural language processor 616 may additionally and/or alternatively include an entity tagger (not depicted) configured to annotate entity references in one or more samples such as references to people (including, for instance, literary characters, celebrities, public figures, etc.), organizations, locations (real and imaginary), and so forth. The entity tagger of the natural language processor 616 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 616 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 616 may rely on annotations from one or more other components of the natural language processor 616. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 616 may use related prior input and/or other related data outside of the particular natural language input to determine one or more annotations.

Figure 7:
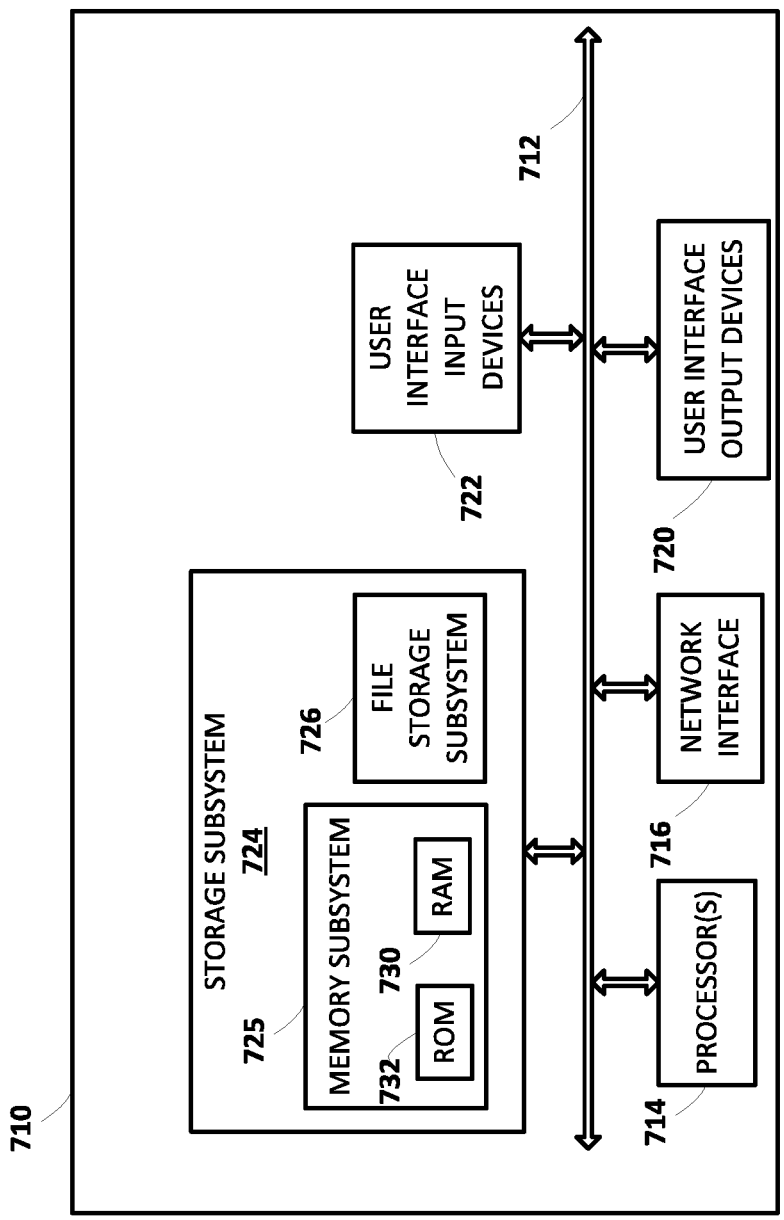
FIG. 7 illustrates an example architecture of a computing device.

FIG. 7 is a block diagram of an example computing device 710 that may optionally be utilized to perform one or more aspects of techniques described herein. In some implementations, one or more of a client computing device, and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of one or more of the processes of FIG. 4 and/or FIG. 5, as well as to implement various components depicted in FIG. 2 and/or FIG. 6.

These software modules are generally executed by processor 714 alone or in combination with other processors. Memory 725 used in the storage subsystem 724 can include a number of memories including a main random access memory ("RAM") 730 for storage of instructions and data during program execution and a read only memory ("ROM") 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, the method including jointly generating a first output stream sequence and a second output stream sequence, using a multi-stream recurrent neural network transducer (MS RNN-T). In some implementations, the MS RNN-T includes an input stream encoder, a first output stream encoder, a second output stream encoder, and a joint network. In some implementations, jointly generating the first output stream sequence and the second output stream sequence, using the MS RNN-T includes initializing an input stream sequence using an initial segment in a sequence of segments. In some implementations, the method further includes initializing the first output stream sequence as empty. In some implementations, the method further includes initializing the second output stream sequence as empty. For each of the segments, in the sequence, and until one or more conditions are satisfied, the method further includes generating an encoded representation of the input stream sequence by processing the input stream sequence using the input stream encoder. In some implementations, the method further includes generating an encoded representation of the first output stream sequence by processing the first output stream sequence using the first output stream encoder. In some implementations, the method further includes generating an encoded representation of the second output stream sequence by processing the second output stream sequence using the second output stream encoder. In some implementations, the method further includes generating predicted output by processing (1) the encoded representation of the input stream sequence, (2) the encoded representation of the first output stream sequence, and (3) the encoded representation of the second output stream sequence, using the joint network. In some implementations, the method further includes determining whether the predicted output corresponds to the first output stream sequence or the second output stream sequence. In some implementations, if the predicted output corresponds to the first output stream sequence, the method further includes updating the first output stream sequence based on the predicted output. In some implementations, if the predicted output corresponds to the second output stream sequence, the method further includes updating the second output stream sequence based on the predicted output. In some implementations, the method further includes updating the input stream sequence based on the next segment in the sequence of the segments.

These and other implementations of the technology disclosed herein can include one or more of the following features.

In some implementations, the input stream sequence is based user interface input of at least one user of a computing device. In some versions of those implementations, the method further includes generating a response to the user interface input based on the first output stream and/or the second output stream. In some versions of those implementations, the method further includes causing the computing device to render the response to the at least one user. In some versions of those implementations, the user interface input is audio data capturing a spoken utterance, and jointly generating the first output stream sequence and the second output stream sequence includes jointly generating a phoneme sequence of the utterance and a grapheme sequence of the utterance. In some versions of those implementations, the user interface input is audio data capturing overlapping speech from a first speaker and a second speaker, and jointly generating the first output stream sequence and the second output stream sequence includes jointly generating a text representation of the speech from the first speaker and a text representation of the speech from the second speaker. In some versions of those implementations, the user interface input is audio data capturing an utterance, the utterance includes at least one portion spoken in a first language by a speaker, and at least one portion spoken in a second language by the speaker. In some versions of those implementations, jointly generating the first output stream sequence and the second output stream sequence includes jointly generating, a text representation of the at least one portion of the utterance spoken in the first language by the speaker, and a text representation of the at least one portion of the utterance spoken in the second language by the speaker.

In some implementations, in a given iteration, determining whether the predicted output corresponds to the first output stream sequence or the second output stream sequence includes determining that the predicted output corresponds to the first output stream sequence. In some implementations, in the given iteration the, the first output stream sequence is updated. In some implementations, updating the first output stream sequence, in the given iteration, includes adding the predicted output, of the given iteration, as a next item in the first output stream sequence.

In some implementations, in an additional iteration, determining whether the predicted output corresponds to the first output stream sequence or the second output stream sequence includes determining that the predicted output corresponds to the second output stream sequence. In some implementations, in the additional iteration, the second output stream sequence is updated. In some implementations, updating the second output stream sequence, in the additional iteration, includes adding the predicted output, of the additional iteration, as a next item in the second output stream sequence.

In some implementations, when the one or more conditions are satisfied, a number of items in the first output stream sequence is greater than a number of items in the second output stream sequence.

In some implementations, when the one or more conditions are satisfied, a number of items in the first output stream sequence is less than a number of items in the second output stream sequence.

In some implementations, prior to generating the first output stream sequence and prior to generating the second output stream sequence, the MS RNN-T is trained using a forward-backward algorithm. In some versions of those implementations, training the MS RNN-T using the forward-backward algorithm includes applying a loop-skewing trick.

In some implementations, the one or more conditions include determining the next segment in the sequence is an end of sequence token.

In some implementations, the predicted output is an end of sequence token, and the one or more conditions include updating the first output stream sequence based on the end of sequence token and/or updating the second output stream based on the end of sequence token.

In some implementations, generating the predicted output by processing (1) the encoded representation of the input stream sequence, (2) the encoded representation of the first output stream sequence, and (3) the encoded representation of the second output stream sequence, using the joint network includes generating the predicted output using the joint network based on a beam search.

In some implementations, a method implemented by one or more processors is provided, the method including generating an output stream using a multi-stream recurrent neural network transducer (MS RNN-T). In some implementations, the MS RNN-T includes a first input stream encoder, a second input stream encoder, an output stream encoder, and a joint network. In some implementations, generating the output stream sequence, using the MS RNN-T includes initializing a first input stream sequence using an initial segment in a first sequence of segments. In some implementations, the method further includes initializing a second input stream sequence using an initial segment in a second sequence of segments. In some implementations, the method further includes initializing the output stream sequence as empty. In some implementations, for each segment in the first sequence of segments, for each segment in the second sequence of segments, and until one or more conditions are satisfied, the method further includes generating an encoded representation of the first input stream sequence by processing the first input stream sequence using the first input stream encoder. In some implementations, the method further includes generating an encoded representation of the second input stream sequence by processing the second input stream sequence using the second input stream encoder. In some implementations, the method further includes generating an encoded representation of the output stream sequence by processing the output stream sequence using the output stream encoder. In some implementations, the method further includes generating predicted output by processing (1) the encoded representation of the first input stream sequence, (2) the encoded representation of the second input stream sequence, and (3) the encoded representation of the output stream sequence, using the joint network. In some implementations, the method further includes updating the output stream sequence based on the predicted output. In some implementations, the method further includes updating the first input stream sequence based on the next segment in the first sequence of segments. In some implementations, the method further includes updating the second input stream sequence based on the next segment in the second sequence of segments.

These and other implementations of the technology disclosed herein can include one or more of the following features.

In some implementations, the first input stream sequence is based on first user interface input of a user of a computing device, the second input stream sequence is based on second user interface input of the user of the computing device, and the method further includes generating a response to the first user interface input and/or the second user interface input based on the output stream. In some implementations, the method further includes causing the computing device to render the response to the user. In some versions of those implementations, the first user interface input is audio data capturing a spoken utterance of the user, the second user interface input is gesture data capturing a gesture of the user, and generating the output stream sequence includes generating a recognition of a user interface command based on the spoken utterance and/or the gesture. In some versions of those implementations, the first user interface input is a first channel of audio data capturing speech from one or more users, the second user interface input is a second channel of audio data capturing the speech from the one or more users, and generating the output stream sequence includes generating a text representation of the speech spoken by the one or more users.

In some implementations, the one or more conditions include determining a next segment in the first sequence is an end of sequence token and/or determining a next segment in the second sequence is an end of sequence token.

In some implementations, the one or more conditions include determining the predicted output is an end of sequence token.

In some implementations, a method implemented by one or more processors is provided, the method including determining an input stream sequence based user interface input of at least one user of a computing device. In some implementations, the method further includes jointly generating a first output stream sequence and a second output stream sequence by processing, the input stream sequence, using a multi-stream recurrent neural network transducer (MS RNN-T). In some implementations, the MS RNN-T includes an input stream encoder, a first output stream encoder, a second output stream encoder, and a joint network. In some implementations, the method further includes generating a response to the user interface input based on the first output stream and/or the second output stream. In some implementations, the method further includes causing the computing device to render the response to the at least one user.

These and other implementations of the technology disclosed herein can include one or more of the following features.

In some implementations, the user interface input is audio data capturing a spoken utterance, and jointly generating the first output stream sequence and the second output stream sequence includes jointly generating a phoneme sequence of the utterance and a grapheme sequence of the utterance.

In some implementations, the user interface input is audio data capturing overlapping speech from a first speaker and a second speaker, and jointly generating the first output stream sequence and the second output stream sequence includes jointly generating a text representation of the speech from the first speaker and a text representation of the speech from the second speaker.

In some implementations, the user interface input is audio data capturing an utterance, wherein the utterance includes at least one portion spoken in a first language by a speaker, and at least one portion spoken in a second language by the speaker, and jointly generating the first output stream sequence and the second output stream sequence includes jointly generating, a text representation of the at least one portion of the utterance spoken in the first language by the speaker, and a text representation of the at least one portion of the utterance spoken in the second language by the speaker.

In some implementations, a method implemented by one or more processors is provided, the method including determining a first input stream sequence based on first user interface input of a user of a computing device. In some implementations, the method further includes determining a second input stream based on a second user interface input of the user of the computing device. In some implementations, the method further includes generating an output stream by processing, the first input stream sequence and the second input stream sequence, using a multi-stream recurrent neural network transducer (MS RNN-T), wherein the MS RNN-T comprises a first input stream encoder, a second input stream encoder, an output stream encoder, and a joint network. In some implementations, the method further includes generating a response to the first user interface input and/or the second user interface input based on the output stream. In some implementations, the method further includes causing the computing device to render the response to the user.

These and other implementations of the technology disclosed herein can include one or more of the following features.

In some implementations, the first user interface input is audio data capturing a spoken utterance of the user, the second user interface input is gesture data capturing a gesture of the user, and generating the output stream sequence includes generating a recognition of a user interface command based on the spoken utterance and/or the gesture.

In some implementations, the first user interface input is a first channel of audio data capturing speech from one or more users, the second user interface input is a second channel of audio data capturing the speech from the one or more users, and generating the output stream sequence includes generating a text representation of the speech spoken by the one or more users.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the methods described herein. Some implementations also include one or more transitory or non-transitory computer readable storage media storing computer instructions executable by one or more processors to perform any of the methods described herein.

What is claimed is:

1. A method implemented by one or more processors, the method comprising:
jointly generating a first output stream sequence and a second output stream sequence, using a multi-stream recurrent neural network transducer (MS RNN-T), wherein the MS RNN-T comprises an input stream encoder, a first output stream encoder, a second output stream encoder, and a joint network, wherein jointly generating the first output stream sequence and the second output stream sequence, using the MS RNN-T comprises:
  initializing an input stream sequence using an initial segment in a sequence of segments, wherein the input stream sequence is based on user interface input of at least one user of a computing device;
  initializing the first output stream sequence as empty;
  initializing the second output stream sequence as empty;
  for each of the segments, in the sequence, and until one or more conditions are satisfied:
    generating an encoded representation of the input stream sequence by processing the input stream sequence using the input stream encoder;
    generating an encoded representation of the first output stream sequence by processing the first output stream sequence using the first output stream encoder;
    generating an encoded representation of the second output stream sequence by processing the second output stream sequence using the second output stream encoder;
    generating predicted output by processing (1) the encoded representation of the input stream sequence, (2) the encoded representation of the first output stream sequence, and (3) the encoded representation of the second output stream sequence, using the joint network;
    determining whether the predicted output corresponds to the first output stream sequence or the second output stream sequence;
    if the predicted output corresponds to the first output stream sequence, updating the first output stream sequence based on the predicted output;
    if the predicted output corresponds to the second output stream sequence, updating the second output stream sequence based on the predicted output; and
    updating the input stream sequence based on the next segment in the sequence of the segments
  generating a response to the user interface input based on the first output stream and/or the second output stream; and
  causing the computing device to render the response to the at least one user.

2. The method of claim 1, wherein the user interface input is audio data capturing a spoken utterance, and wherein jointly generating the first output stream sequence and the second output stream sequence comprises jointly generating a phoneme sequence of the utterance and a grapheme sequence of the utterance.

3. The method of claim 1, wherein the user interface input is audio data capturing overlapping speech from a first speaker and a second speaker, and wherein jointly generating the first output stream sequence and the second output stream sequence comprises jointly generating a text representation of the speech from the first speaker and a text representation of the speech from the second speaker.

4. The method of claim 1, wherein the user interface input is audio data capturing an utterance, wherein the utterance includes at least one portion spoken in a first language by a speaker, and at least one portion spoken in a second language by the speaker, and wherein jointly generating the first output stream sequence and the second output stream sequence comprises jointly generating, a text representation of the at least one portion of the utterance spoken in the first language by the speaker, and a text representation of the at least one portion of the utterance spoken in the second language by the speaker.

5. The method of claim 1, wherein in a given iteration, determining whether the predicted output corresponds to the first output stream sequence or the second output stream sequence comprises determining that that the predicted output corresponds to the first output stream sequence; wherein, in the given iteration, the first output stream sequence is updated, and wherein updating the first output stream sequence, in the given iteration, comprises adding the predicted output, of the given iteration, as a next item in the first output stream sequence.

6. The method of claim 1, wherein in an additional iteration, determining whether the predicted output corresponds to the first output stream sequence or the second output stream sequence comprises determining that the predicted output corresponds to the second output stream sequence; wherein, in the additional iteration, the second output stream sequence is updated, and wherein updating the second output stream sequence, in the additional iteration, comprises adding the predicted output, of the additional iteration, as a next item in the second output stream sequence.

7. The method of claim 1, wherein, when the one or more conditions are satisfied, a number of items in the first output stream sequence is greater than a number of items in the second output stream sequence.

8. The method of claim 1, wherein, when the one or more conditions are satisfied, a number of items in the first output stream sequence is less than a number of items in the second output stream sequence.

9. The method of claim 1, wherein, prior to generating the first output stream sequence and prior to generating the second output stream sequence, the MS RNN-T is trained using a forward-backward algorithm.

10. The method of claim 9, wherein training the MS RNN-T using the forward-backward algorithm comprises applying a loop-skewing trick.

11. The method of claim 1, wherein the one or more conditions include determining the next segment in the sequence is an end of sequence token.

12. The method of claim 1, wherein the predicted output is an end of sequence token, and wherein the one or more conditions include updating the first output stream sequence based on the end of sequence token and/or updating the second output stream sequence based on the end of sequence token.

13. The method of claim 1, wherein generating the predicted output by processing (1) the encoded representation of the input stream sequence, (2) the encoded representation of the first output stream sequence, and (3) the encoded representation of the second output stream sequence, using the joint network comprises: generating the predicted output using the joint network based on a beam search.

14. A method implemented by one or more processors, the method comprising:
  generating an output stream using a multi-stream recurrent neural network transducer (MS RNN-T), wherein the MS RNN-T comprises a first input stream encoder, a second input stream encoder, an output stream encoder, and a joint network, wherein generating the output stream sequence, using the MS RNN-T comprises:
    initializing a first input stream sequence using an initial segment in a first sequence of segments, wherein the first input stream sequence is based on first user interface input of a user of a computing device;
    initializing a second input stream sequence using an initial segment in a second sequence of segments, wherein the second input stream sequence is based on second user interface input of the user of the computing device;
    initializing the output stream sequence as empty;
    for each segment in the first sequence of segments, for each segment in the second sequence of segments, and until one or more conditions are satisfied:
      generating an encoded representation of the first input stream sequence by processing the first input stream sequence using the first input stream encoder;
      generating an encoded representation of the second input stream sequence by processing the second input stream sequence using the second input stream encoder;
      generating an encoded representation of the output stream sequence by processing the output stream sequence using the output stream encoder;
      generating predicted output by processing (1) the encoded representation of the first input stream sequence, (2) the encoded representation of the second input stream sequence, and (3) the encoded representation of the output stream sequence, using the joint network;
      updating the output stream sequence based on the predicted output;
      updating the first input stream sequence based on the next segment in the first sequence of segments; and
      updating the second input stream sequence based on the next segment in the second sequence of segments
    generating a response to the first user interface input and/or the second user interface input based on the output stream; and
    causing the computing device to render the response to the user.

15. The method of claim 14, wherein the first user interface input is audio data capturing a spoken utterance of the user, the second user interface input is gesture data capturing a gesture of the user, and wherein generating the output stream sequence comprises generating a recognition of a user interface command based on the spoken utterance and/or the gesture.

16. The method of claim 14, wherein the first user interface input is a first channel of audio data capturing speech from one or more users, the second user interface input is a second channel of audio data capturing the speech from the one or more users, and wherein generating the output stream sequence comprises generating a text representation of the speech spoken by the one or more users.

17. The method of claim 14, wherein the one or more conditions include determining a next segment in the first sequence is an end of sequence token and/or determining a next segment in the second sequence is an end of sequence token.

18. A method implemented by one or more processors, the method comprising:
   determining an input stream sequence based on user interface input of at least one user of a computing device;
   jointly generating a first output stream sequence and a second output stream sequence by processing, the input stream sequence, using a multi-stream recurrent neural network transducer (MS RNN-T), wherein the MS RNN-T comprises an input stream encoder, a first output stream encoder, a second output stream encoder, and a joint network;
   generating a response to the user interface input based on the first output stream and/or the second output stream; and
   causing the computing device to render the response to the at least one user.

19. The method of claim 18, wherein the user interface input is audio data capturing a spoken utterance, and wherein jointly generating the first output stream sequence and the second output stream sequence comprises jointly generating a phoneme sequence of the utterance and a grapheme sequence of the utterance.

20. The method of claim 18, wherein the user interface input is audio data capturing overlapping speech from a first speaker and a second speaker, and wherein jointly generating the first output stream sequence and the second output stream sequence comprises jointly generating a text representation of the speech from the first speaker and a text representation of the speech from the second speaker.

21. The method of claim 18, wherein the user interface input is audio data capturing an utterance, wherein the utterance includes at least one portion spoken in a first language by a speaker, and at least one portion spoken in a second language by the speaker, and wherein jointly generating the first output stream sequence and the second output stream sequence comprises jointly generating, a text representation of the at least one portion of the utterance spoken in the first language by the speaker, and a text representation of the at least one portion of the utterance spoken in the second language by the speaker.

* * * * *